April 28, 1931.   N. L. CAUSAN   1,803,055
CHASSIS FOR MOTOR VEHICLES
Filed April 18, 1929   2 Sheets-Sheet 1
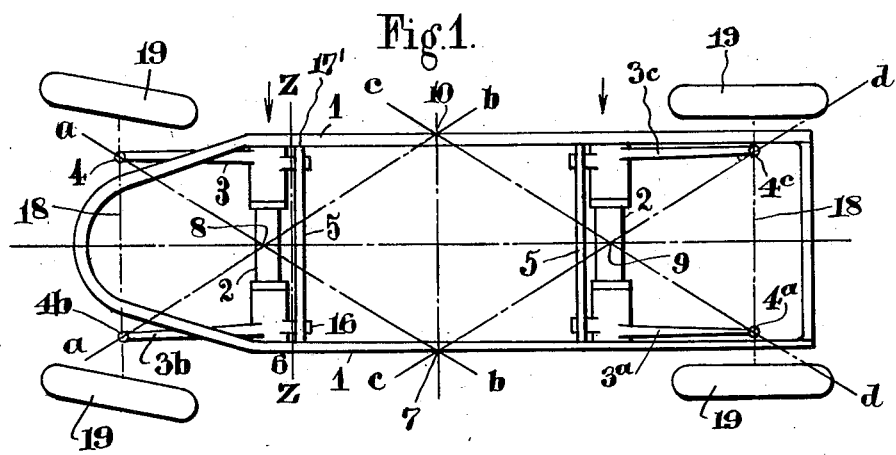
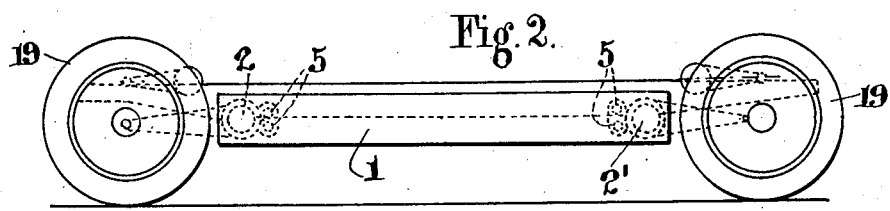
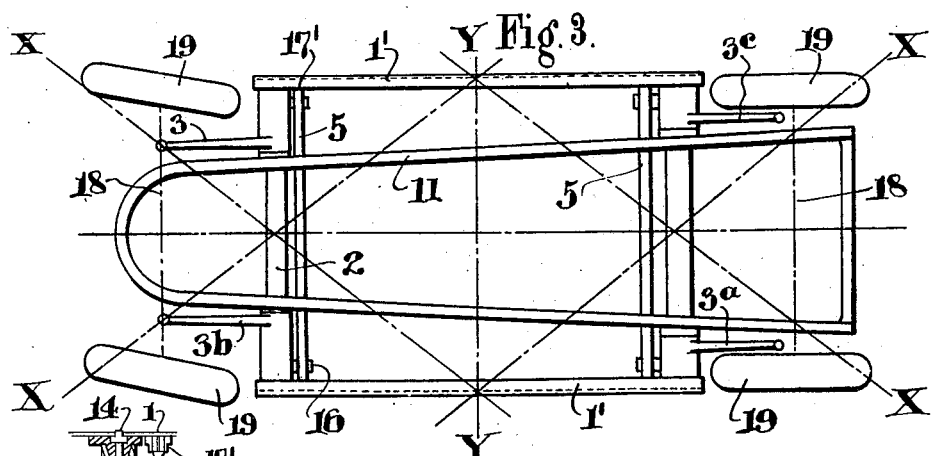
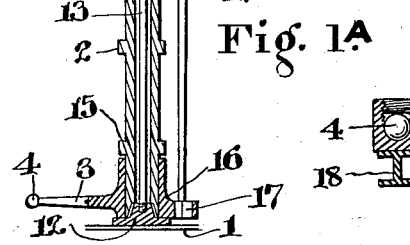
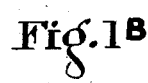
INVENTOR:
Nemorin Laurent Causan
BY
ATTORNEY April 28, 1931.  N. L. CAUSAN  1,803,055
CHASSIS FOR MOTOR VEHICLES
Filed April 18, 1929   2 Sheets-Sheet 2
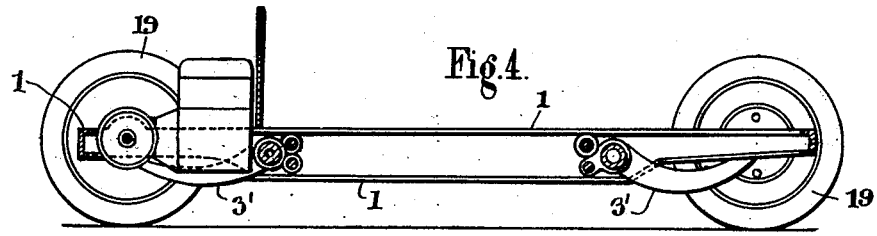
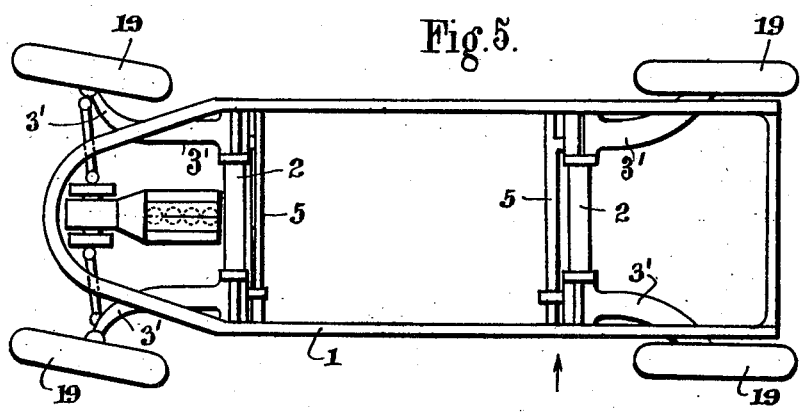
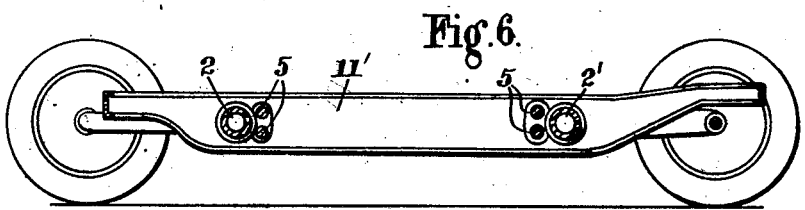
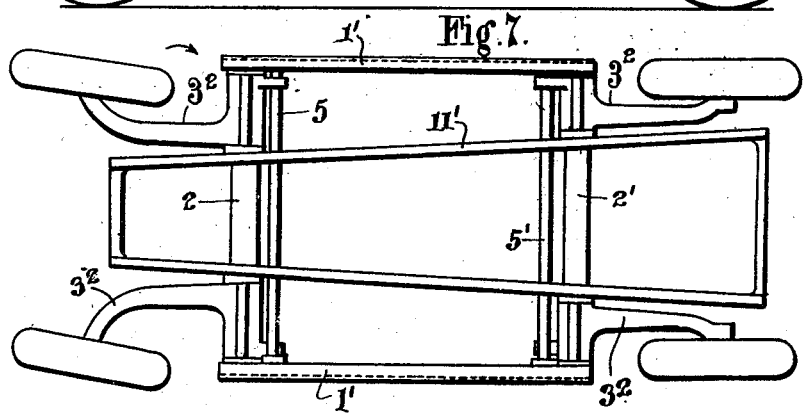
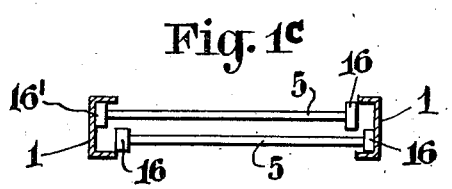
INVENTOR:
Nemorin Laurent Causan
BY
ATTORNEY Patented Apr. 28, 1931

1,803,055

UNITED STATES PATENT OFFICE

NEMORIN LAURENT CAUSAN, OF SURESNES, FRANCE

CHASSIS FOR MOTOR VEHICLES

Application filed April 18, 1929, Serial No. 356,234, and in France April 25, 1928.

The present invention has for its object a chassis or frame for motor vehicles which will be free from any twisting stresses regardless of conditions of ground unevenness and load distribution.

In the accompanying drawings, several different embodiments of the invention are illustrated, by way of example, all of which are based on the same general principles.

Figure 1 is a diagrammatic plan view of the preferred form, utilizing conventional front and rear axles;

Fig. 1$^A$ is a horizontal section showing the mounting of the tubular cross-ties, and Fig. 1$^B$ is a detail of one of the ball-and-socket joints indicated in Fig. 1, while Fig. 1$^C$ is a diagrammatic section on line Z—Z', Fig. 1;

Figs. 2 and 3 are, respectively, a side elevation and a plan view of a modification;
Figs. 4 and 5 are corresponding views of a second modification, and Figs. 6 and 7 are similar views of a third modification.

Referring first to Fig. 1 and its related Figures 1$^A$, 1$^B$ and 1$^C$, it will be seen that the frame or chassis proper consists of two side rails 1 connected by two tubular cross-ties 2, 2', upon each of which ties are pivotally mounted two levers; those for tie 2 being designated 3, 3$b$, and those for tie 2' being designated 3$c$ and 3$a$. The outer ends of the levers are connected to the corresponding axles 18 by ball-and-socket joints 4, 4$b$, 4$c$, 4$a$, one of these joints being illustrated in Fig. 1$^B$. Each side rail 1, as shown in Fig. 1$^A$, has fastened to it a conical part or member 12 rigidly secured to the adjacent end of a stretcher rod 13 that passes through the tubular cross-tie 2 or 2', said rod being designed to insure the rigidity of the assemblage by means of a clamping device 14 which is accessible from the outside.

The aforesaid levers are mounted on the ends of the cross-ties where they are held in place by shoulders 15, and they are provided at 16 and 16' with ears through which are formed square holes 17 to receive one end of one of the suspension springs 5, the other end of which is secured to the opposite side rail by means of a suitable socket member 17'.
Fig. 1$^B$ shows only one lever and only one spring; the other lever being mounted symmetrically with the one represented, while the two springs are arranged in different horizontal planes (see Fig. 1$^C$) to prevent them from interfering with each other. The said springs are preferably in the form of straight rods working under torsion.

The condition essential to neutralizing the torsional stresses set up by the poor distribution of the loads upon the wheels 19, is that the joints 4, 4$b$, 4$c$ and 4$a$ (viewed in plan) be arranged on the extensions of the imaginary bias lines $a$—$b$ and $c$—$d$ (Fig. 1) which connect the centers 7 and 10 of the portions of the two side rails located between the two cross-ties 2, 2' with the centers 8 and 9 of said ties.

To demonstrate that with such an arrangement the non-warpability of the chassis is obtained independently of the rigidity of its component parts, it will be supposed that the chassis is supported solely by the two joints 4 and 4$a$. The assemblage of the parts 3, 2 and 5 and the portion of the side rail 1 comprised between the points 6 and 7 may be considered as a lever whose working points are 4, 8 and 7, so that the chassis sustains, at each of the points 8 and 9 (the centers of the two cross-ties 2, 2'), a force acting upwardly from bottom to top, and at each of the points 7 and 10 (the centers of the two side rails) a force acting downwardly from top to bottom.

Supposing, now, that the chassis is supported by the other two joints 4$b$ and 4$c$ alone, it will readily be understood that the forces applied, respectively, at the points 7, 8, 9 and 10 will not change. The chassis sustaining the same forces applied at the same points, regardless of the distribution of the load on the wheels, is naturally, therefore, non-warpable.

If the condition of alinement of the points 4, 8 and 7, on the one hand, and 4$c$, 9 and 7, on the other hand, and their symmetrical arrangement, is only approximately answered (see the lines X—Y in Fig. 3), it follows that weak torsional stresses are set up, which are easily sustained by the rigidity of the vehicle structure as a whole. This is the case with the rear part of the modified structure shown in Figs. 2 and 3 wherein, in order to reduce the length of the levers carried by the cross-ties, the frame constituted by said ties and the two side rails 1' is widened and is independent of the frame 11 which supports the vehicle body.

The additional modifications shown, on the one hand, in Figs. 4 and 5, and in Figs. 6 and 7, on the other hand, differ, respectively, from the corresponding constructions represented in Fig. 1 and in Figs. 2–3 merely in that the levers 3' and 3² carry the wheels 19 directly, the mounting being the same as that in known vehicles with independent wheels. The main frame in Figs. 6 and 7 is designated 1', and the body-supporting frame is designated 11', to agree with Figs. 2, 3. Figs. 6 and 7 further agree with Figs. 2, 3 in that the condition that the centers of the wheels (when seen in plan) must be situated on prolongations of the imaginary bias lines connecting the said wheel centers with the middle points of the side rails and the cross-ties, for the purpose of neutralizing torsional stresses, is fully answered therein, but is only approximately answered in Figs. 4, 5.

I claim as my invention:—

1. A chassis for motor vehicles which is inherently non-warpable regardless of distribution of the load upon the wheels, such chassis comprising two side rails; two cross-ties connecting the corresponding front and rear portions of said rails; a pair of levers pivoted on each cross-tie; a suspension spring associated with each lever and working under torsion, each spring connecting one end of the corresponding lever with the opposite side rail; and a pivotal connection between the other end of each lever and the adjacent wheel axle; the points of said pivotal connections being situated, when viewed in plan, in prolongations of the imaginary lines which join the middle parts of the portions of the side rails located between the cross-ties with the middle parts of said ties.

2. A chassis for motor vehicles which is inherently non-warpable regardless of the distribution of the load upon the wheels, such chassis comprising two side rails and two cross-ties connected together; a pair of supporting levers pivoted on each cross-tie; a suspension spring associated with each lever and working under torsion; and a set of wheels, one for each lever, each lever being pivotally connected at one end with a wheel, and at the other end, by means of the associated spring, with the opposite side rail; the pivot point of each wheel being situated in the prolongation of an imaginary line which joins the middle part of a side rail with that of a cross tie.

In testimony whereof I affix my signature.

NEMORIN LAURENT CAUSAN.